United States Patent
Anderson

(10) Patent No.: US 9,969,350 B2
(45) Date of Patent: *May 15, 2018

(54) DUAL-CHAMBERED PASSENGER AIRBAG

(71) Applicant: TK Holdings Inc., Auburn Hills, MI (US)

(72) Inventor: Christopher L. Anderson, Harrison Toawnship, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/262,103

(22) Filed: Sep. 12, 2016

(65) Prior Publication Data

US 2016/0375854 A1 Dec. 29, 2016

Related U.S. Application Data

(63) Continuation of application No. 14/502,232, filed on Sep. 30, 2014, now Pat. No. 9,440,612.

(51) Int. Cl.
| | |
|---|---|
| *B60R 21/16* | (2006.01) |
| *B60R 21/239* | (2006.01) |
| *B60R 21/233* | (2006.01) |
| *B60R 21/2338* | (2011.01) |
| *B60R 21/276* | (2006.01) |

(52) U.S. Cl.
CPC .......... *B60R 21/239* (2013.01); *B60R 21/233* (2013.01); *B60R 21/2338* (2013.01); *B60R 21/276* (2013.01); *B60R 2021/2395* (2013.01); *B60R 2021/23308* (2013.01); *B60R 2021/23324* (2013.01); *B60R 2021/23382* (2013.01)

(58) Field of Classification Search
CPC ....... B60R 21/16; B60R 21/205; B60R 21/23; B60R 21/2338; B60R 2021/23382; B60R 2021/23384
USPC ................ 280/730.2, 743.1, 743.2
See application file for complete search history.

(56) References Cited

U.S. PATENT DOCUMENTS

| | | | |
|---|---|---|---|
| 5,586,782 A * | 12/1996 | Zimmerman, II | ........................ B60R 21/23138 280/730.2 |
| 5,853,191 A * | 12/1998 | Lachat | .............. B60R 21/23138 280/729 |
| 5,899,490 A * | 5/1999 | Wipasuramonton | .. B60R 21/237 280/730.2 |
| 5,913,536 A * | 6/1999 | Brown | .................. B60R 21/207 280/728.2 |

(Continued)

*Primary Examiner* — Toan To
(74) *Attorney, Agent, or Firm* — Meunier Carlin & Curfman LLC

(57) ABSTRACT

An airbag includes an outer shell defining an interior, at least one vent opening structured to enable fluid communication between the interior and an exterior of the airbag, and a divider dividing the airbag interior into an upper chamber and a lower chamber. The divider is deflectable in a first direction toward the lower chamber and in a second direction toward the upper chamber. A vent cover is coupled to the at least one vent opening and to the divider so as to close over and restrict a flow of gas through the at least one vent opening when the divider is deflected in the first direction, and so as to permit the vent cover to open so as to enable an unobstructed flow of gas through the at least one vent opening when the divider is deflected in the second direction.

20 Claims, 9 Drawing Sheets

(56) References Cited

U.S. PATENT DOCUMENTS

| | | | |
|---|---|---|---|
| 6,059,311 A * | 5/2000 | Wipasuramonton | B60R 21/213 280/729 |
| 6,371,518 B1 * | 4/2002 | Kalandek | B60R 21/201 280/730.1 |
| 6,439,605 B2 | 8/2002 | Ariyoshi | |
| 7,857,347 B2 | 12/2010 | Abe et al. | |
| 7,946,613 B2 | 5/2011 | Rose et al. | |
| 9,027,956 B2 | 5/2015 | Yamaji | |
| 9,440,612 B2 | 9/2016 | Anderson | |
| 9,475,450 B2 | 10/2016 | Hiraiwa et al. | |
| 2005/0212275 A1 * | 9/2005 | Hasebe | B60R 21/201 280/743.1 |
| 2009/0039630 A1 * | 2/2009 | Schneider | B60R 21/2338 280/740 |
| 2010/0032931 A1 * | 2/2010 | Kumagai | B60R 21/2338 280/742 |
| 2010/0102542 A1 * | 4/2010 | Nakajima | B60R 21/233 280/743.2 |
| 2010/0156078 A1 * | 6/2010 | Miyata | B60R 21/231 280/743.2 |
| 2011/0285119 A1 * | 11/2011 | Yamamoto | B60R 21/23138 280/743.2 |
| 2012/0074677 A1 * | 3/2012 | Hiruta | B60R 21/2338 280/739 |

* cited by examiner

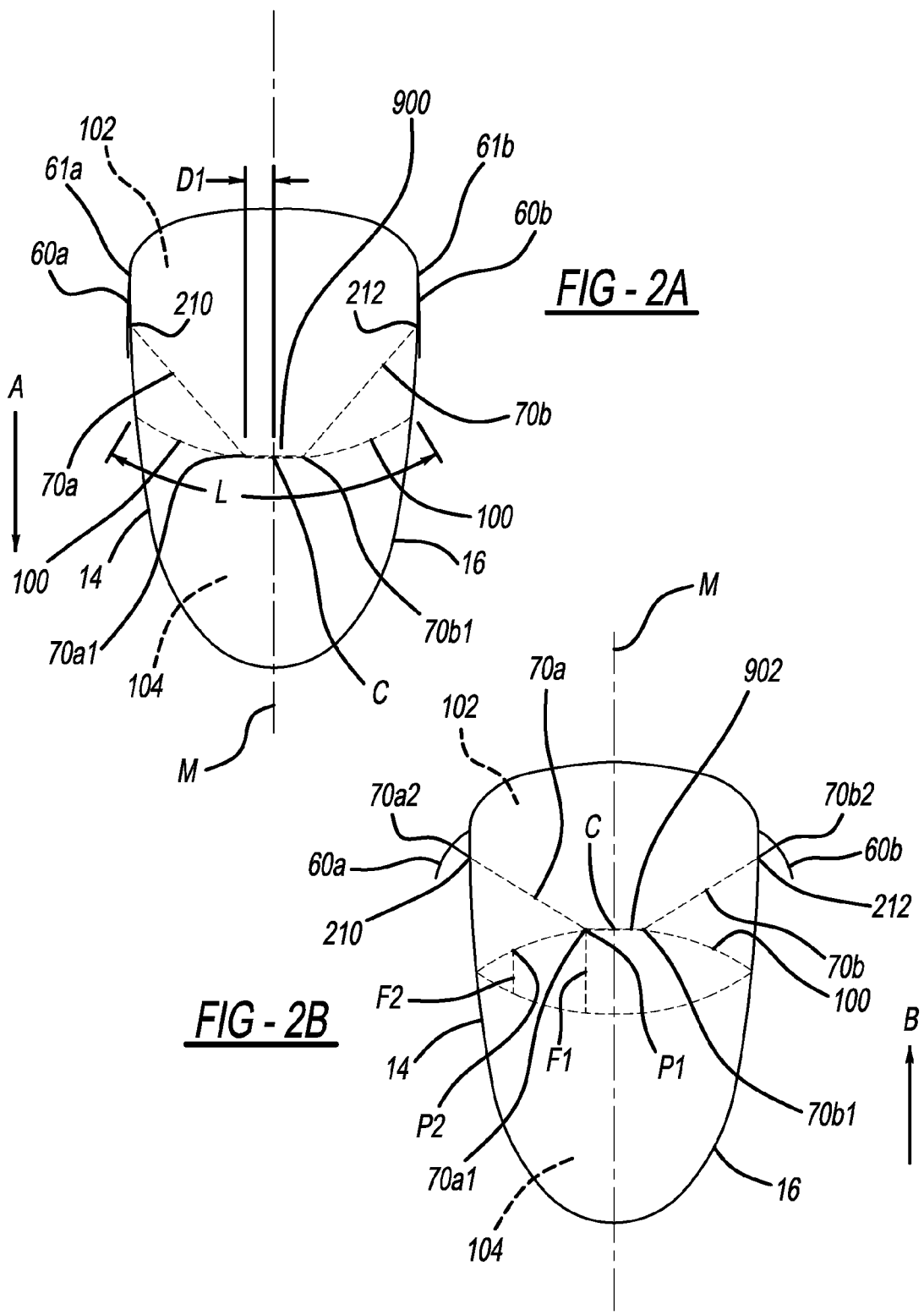

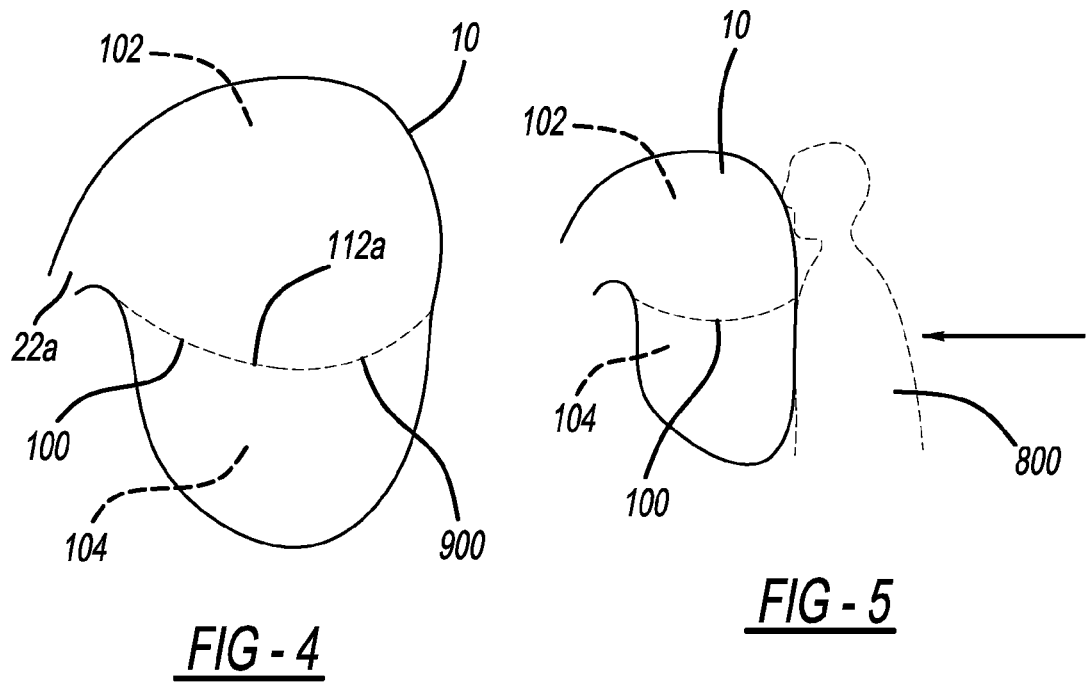
FIG - 4
FIG - 5
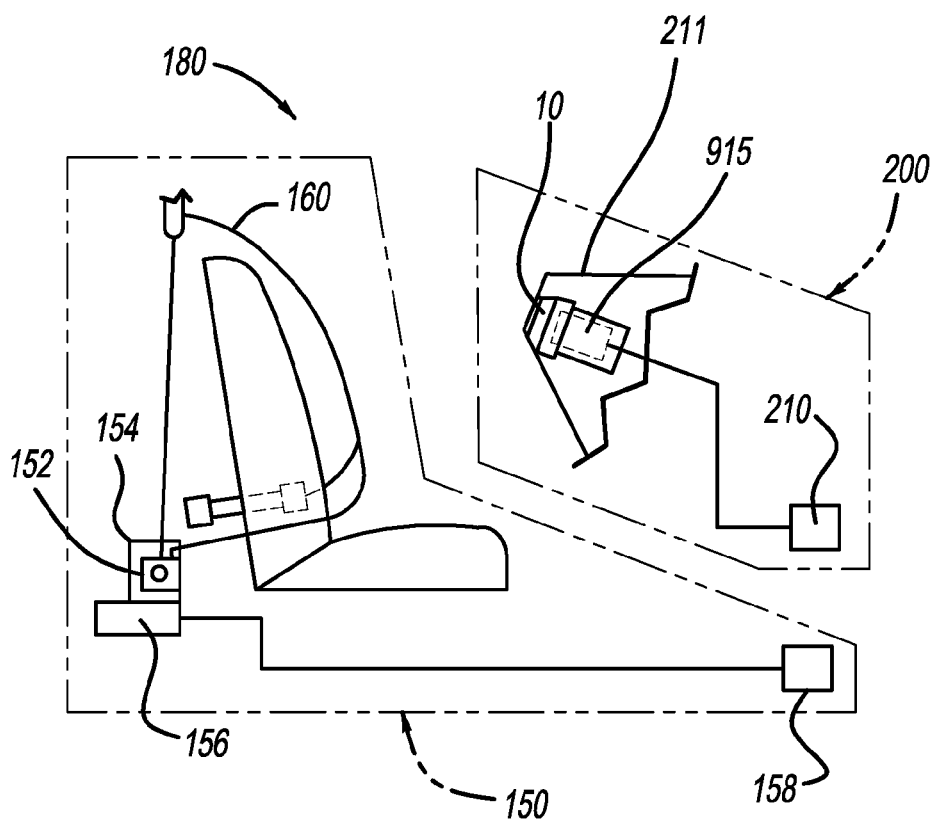
FIG - 10

DUAL-CHAMBERED PASSENGER AIRBAG

CROSS-REFERENCE TO RELATED APPLICATIONS

This application is a continuation application of co-pending and co-owned U.S. application Ser. No. 14/502,232 having a filing date of Sep. 30, 2014, which claims the benefit of U.S. Provisional Application Ser. No. 61/884,944, filed on Sep. 30, 2013, the disclosures of which are herein incorporated by reference in their entirety.

BACKGROUND OF THE INVENTION

The present invention relates a passenger airbag, which is filled with gas during an emergency situation such as, for example, a frontal or side impact.

SUMMARY OF THE INVENTION

In one aspect of the embodiments described herein, an airbag is provided including an outer shell defining an interior, at least one vent opening structured to enable fluid communication between the interior and an exterior of the airbag, and a divider dividing the airbag interior into an upper chamber and a lower chamber. The divider is deflectable in a first direction toward the lower chamber and in a second direction toward the upper chamber. A vent cover is coupled to the at least one vent opening and to the divider so as to close over and restrict a flow of gas through the at least one vent opening when the divider is deflected in the first direction, and so as to permit the vent cover to open so as to enable an unobstructed flow of gas through the at least one vent opening when the divider is deflected in the second direction.

In another aspect of the embodiments of the described herein, an airbag is provided including an outer shell defining an interior, and at least one vent opening structured to enable fluid communication between the interior and an exterior of the airbag. A divider divides the airbag interior into a first chamber and a second chamber separate from, and in fluid communication with, the first chamber. The divider is structured to deflect toward the second chamber when a pressure in the first chamber is greater than a pressure in the second chamber, and is also structured to deflect toward the first chamber when a pressure in the second chamber is greater than a pressure in the first chamber. A vent cover is closable over the at least one vent opening so as to restrict a flow of gas through the at least one vent opening. The vent cover is also openable so as to permit an unobstructed flow of gas through the at least one vent opening. An inter-chamber venting system is operatively coupled to the divider. The venting system is openable to permit gas to flow unobstructed from the first chamber through the divider into the second chamber, when a pressure in the first chamber is greater than a pressure in the second chamber. The venting system is closable to restrict gas backflow from the second chamber into the first chamber when the pressure in the second chamber is greater than a pressure in the first chamber. A tether operatively connects the vent cover to the divider such that the vent cover is closed when the divider is deflected toward the second chamber, and such that the vent cover is open when the divider is deflected toward the first chamber.

In another aspect of the embodiments described herein, an airbag is provided including an outer shell defining an interior and a divider dividing the interior into an upper chamber and a lower chamber separate from, and in fluid communication with, the upper chamber. The divider is deflectable toward the lower chamber and also toward the upper chamber. At least one vent opening is structured to enable fluid communication between the interior and an exterior of the airbag. A vent cover is closable to restrict a flow of gas through the at least one vent opening when the divider is deflected in the first direction, and openable so as to permit an unobstructed flow of gas through the at least one vent opening. The vent cover is operatively coupled to the divider such that the vent cover is openable when the divider is deflected in a direction toward the first chamber and closed when the divider is deflected toward the second chamber. The divider is structured to deflect in a direction toward the first chamber responsive to pressure exerted on the airbag exterior by contact with a torso of a vehicle occupant, prior to contact between a head of the occupant and the airbag.

In another aspect of the embodiments described herein, an airbag includes at least one panel defining an interior of the airbag, at least one vent opening structured to enable fluid communication between the interior and an exterior of the airbag, and a divider positioned in the interior so as to divide the interior into an upper chamber and a lower chamber. The divider has least one opening formed therealong. The at least one opening is positioned such that all edges of the at least one opening reside within a zone (Z3) bounded by a first vertical plane (P15) residing a predetermined distance (1000f) from an inflator side (22) of the airbag toward an occupant contact side of the airbag, and a second vertical plane (P14) passing through a predetermined location (701) defined through a shoulder bolt (701) of a Hybrid III 6-year old anthropomorphic test device in Position 1 defined by FMVSS208 Out of Position testing. The divider is deflectable in a first direction toward the lower chamber and in a second direction toward the upper chamber. A vent cover is operatively coupled to the at least one vent opening and to the divider so as to close over and restrict a flow of gas through the at least one vent opening when the divider is deflected in the first direction, and so as to permit the vent cover to open so as to enable an unobstructed flow of gas through the at least one vent opening when the divider is deflected in the second direction.

BRIEF DESCRIPTION OF THE DRAWINGS

FIG. 2A is a schematic view of the airbag embodiment shown in FIG. 1 from the perspective of a vehicle occupant, and showing the airbag during an initial portion of the airbag deployment with vent covers in a closed condition.

FIG. 2B is a schematic view of the airbag embodiment shown in FIG. 1 from the perspective of a vehicle occupant, and showing the airbag during a final portion of the airbag deployment with vent covers in an open condition.

FIG. 4 is a schematic perspective view of the airbag embodiment shown in FIG. 2A.

FIG. 5 is a schematic view of the airbag embodiment shown in FIG. 1 from the perspective of a vehicle occupant, and showing the airbag during an intermediate portion of the airbag deployment.

FIG. 10 is a schematic representation of an exemplary vehicle occupant protection system including an airbag in accordance with an embodiment described herein.

DETAILED DESCRIPTION

Embodiments of the present invention will be described below with reference to the drawings. One of ordinary skill in the art will appreciate the various aspects of airbag design, construction and operation applicable to the embodiments of the present invention described herein. U.S. Pat. Nos. 6,886,857, 7,857,347, 8,128,124, and 8,322,748, for example, describe many such aspects and are incorporated herein by reference in their entirety, but not by way of limitation.

Figure 1:
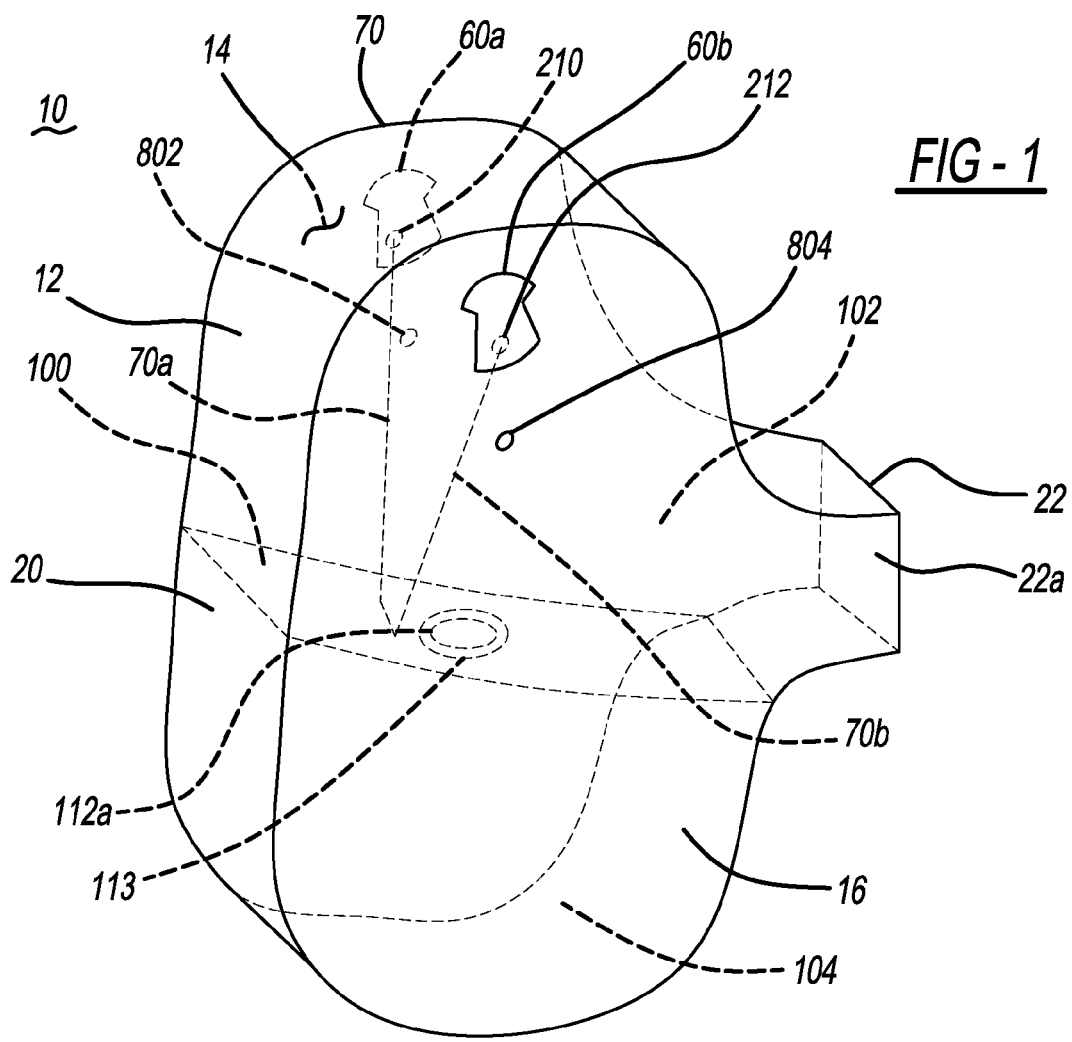
FIG. 1 is a perspective view of a passenger-side airbag (in an inflated state) incorporating an airbag venting system in accordance with an embodiment described herein.

FIG. 1 is a perspective view of one embodiment of a passenger-side airbag 10 (in an inflated state). The airbag embodiment shown in FIG. 1 is formed from three panels. Specifically, the airbag is formed of a main panel 12, a right side (when viewing the airbag from a seated position) panel 16, and a left side panel 14 opposite the right side panel 16. Each of the side panels 14, 16 is generally planar (when the airbag 10 is not inflated). The main panel 12 connects the left and right side panels and wraps around the airbag 10. As a result, the entirety of the left edge of the main panel 12 is connected along a seam 70 (e.g., by stitching, sewing, adhesive attachment or other suitable means) to the left panel 14 and the entirety of the right edge of the main panel 12 is connected along a seam 72 (e.g., by stitching, sewing, or other suitable means) to the right panel 16. In the embodiment shown, the panels 12, 14 and 16 combine to form an outer shell of the airbag.

The main panel 12 has both a front impact side or occupant contact face 20 and a rear inflation side 22. Side panels 14 and 16 and main panel 12 also combine to define a mouth 22a of the airbag through which gas is injected into the airbag. After wrapping around the airbag 10, ends of the main panel 12 are joined at the rear inflation side to define opposite edges of mouth 22a. In addition, the rear inflation side 22 has slits (not shown) which are sized to receive an inflator (not shown), and may also include holes (not shown) which are sized to receive bolts (or other suitable fasteners) that are configured to secure the airbag 10 to the body of an automobile or other device. Portions of one or more of panels 12, 14, 16 defining an upper chamber 102 of the airbag may also incorporate one or more vents (such as, for example, holes 210 and 212 in the embodiment shown in FIG. 1) therein to release gas from the upper chamber in a controlled manner during contact between a passenger and the airbag. Panels 12, 14 and 16 and divider 100 may be formed in a known manner from gas-impermeable fabric(s) or other suitable gas-impermeable material(s).

A first vent hole (shown schematically as element 210) is provided in left panel 14, and a second vent hole (shown schematically as element 212) is provided in right panel 16. Vent holes 210 and 212 enable fluid communication between the interior of the airbag and the exterior of the airbag. In the embodiment shown, the vent holes 210 and 212 enable fluid communication between the upper chamber 102 and the exterior of the airbag.

Referring to FIGS. 2A, 2B, 3 and 3A, a pair of actuatable vent covers or lid members 60a and 60b are attached to associated exterior surfaces of the airbag so as to enable each lid member to cover an associated one of vent holes 210 and 212. In a closed condition, each lid member contacts the bag exterior to close its associated vent hole thereby restricting gas flow from the airbag interior through the vent hole to the exterior of the airbag. When a lid member is in an open condition, the portion of the lid member covering the vent opening is spaced apart from the side panel to which it is attached and spaced apart from all of the edges of the vent opening, thereby removing obstructions blocking the vent hole itself and permitting gases to flow from the airbag interior out of the airbag through the associated vent hole.

Referring to FIGS. 1 and 4, a divider 100 is stitched or otherwise suitably attached along a perimeter thereof to interior surfaces of the main, left and right airbag panels. The divider 100 is attached to the panel interior surfaces so as to form a gas-tight seal between the divider and the panels to which it is attached. Divider 100 divides the airbag interior into a first or upper chamber 102 and a second or lower chamber 104. At least one opening 112a is provided to enable fluid communication between upper chamber 102 and lower chamber 104.

An inter-chamber venting system is provided to permit gas to flow from a first one of chambers 102 and 104 into the other one of the chambers 102 and 104, and also to restrict backflow from the lower chamber 104 back into the upper chamber 102. In one embodiment, a flow restriction valve mechanism (schematically shown as element 113 in FIGS. 1 and 4) is incorporated into or operatively attached to divider 100 for restricting gas flow through opening 112a between the two chambers. The valve may have any of a number of structures suitable for restricting gas flow in the airbag interior, in the manner described herein.

In the particular embodiment shown in the drawings, the flow restriction valve mechanism is positioned and structured to permit gas flowing into or residing in upper chamber 102 to flow freely into lower chamber 104, while restricting backflow of the gases from the lower chamber into the upper chamber. The gas flow rate from the upper chamber 102 into the lower chamber 104 through opening 112a may be controlled by controlling the dimensions of opening 112a and the valve structure and dimensions. Further to this end, in particular embodiments, the valve is structured to close responsive to occurrence of a pressure differential between the lower and upper chambers tending to force gas in a direction opposite the airbag fill direction (i.e., tending to force gas in a direction from the second chamber into the first chamber), thus enabling maintenance of a prolonged sustained relatively high, inflated pressure in the lower chamber.

In the embodiment shown in the drawings, opening 112a and the associated valve mechanism 113 restricting flow through the valve are located proximate a center of the divider, or at least spaced apart from the panels forming the walls of the airbag. In alternative embodiments, the divider opening(s) and associated valve mechanism(s) may be positioned along a seam or intersection between the divider 100 and one or more of the airbag panels 12, 14 and 16. Examples of dividers and valve structures suitable for controlling gas flow between the upper and lower chambers in accordance with the applications contemplated herein are disclosed in U.S. Provisional Application Nos. 61/865,095 and 61/862,491, the disclosures of which are incorporated herein in their entireties. Other divider and/or valve configurations may also be used. However, it is desirable that any valve mechanism used rapidly actuate (responsive to a relatively higher pressure in the lower chamber) to prevent or restrict backflow of gases into upper chamber 102, such that pressure in the lower chamber and the resulting support for the torso of the vehicle occupant are maintained for a time period sufficient to permit venting of the upper chamber gases responsive to pressure exerted by the occupant's head on the airbag exterior of the upper chamber.

In embodiments described herein, the divider is structured and attached to the panels 12, 14 and 16 such that the portions of divider 100 spaced apart from the attachments or not directly attached to the outer panels will deflect in a first direction "A" (as shown in FIG. 2A) toward lower chamber 104 responsive to a pressure differential inside the airbag wherein the upper chamber pressure is greater than the lower chamber pressure (for example, during the initial fill stage after airbag activation). Divider 100 is also configured and attached to panels 12, 14 and 16 such that the portions of divider 100 spaced apart from the attachments or not directly attached to the outer panels will deflect in a second direction "B" (as shown in FIG. 2B) extending toward upper chamber 102 responsive to a pressure differential inside the airbag wherein the lower chamber pressure is greater than the upper chamber pressure (for example, when a passenger impacts a lower portion of the airbag, causing a pressure surge in lower chamber 104). The divider may be generally planar or deflect slightly downwardly due to gravity when the pressures in the upper and lower chambers are effectively equal.

In addition, divider 100 is configured and attached to panels 12, 14 and 16, and tether members 70a and 70b (described in greater detail below) are structured and attached to associated portions of the divider at anchor locations 70a1 and 70b1 specified such that during deflection or bulging of the divider in direction "A" into configuration 900 of FIG. 2A, tension is maintained in tethers 70a and 70b by the deflection of the divider, whereby lid members 60a and 60b are maintained in a closed condition against the pressure exerted by gases inside the airbag, thereby preventing pressurized gases from exiting the airbag through openings 210 and 212. Also, divider 100 is configured and attached to panels 12, 14 and 16, and tether members 70a and 70b are structured and attached to associated portions of the divider at locations 70a1 and 70b1 specified such that during deflection or bulging of the divider in direction "B" (opposite direction "A") into configuration 902, the resulting travel of anchor locations 70a1 and 70b1 in direction "B" permits the pressure inside the airbag to open lid members 60a and 60b, there by permitting gases to escape through openings 210 and 212.

Figure 3:
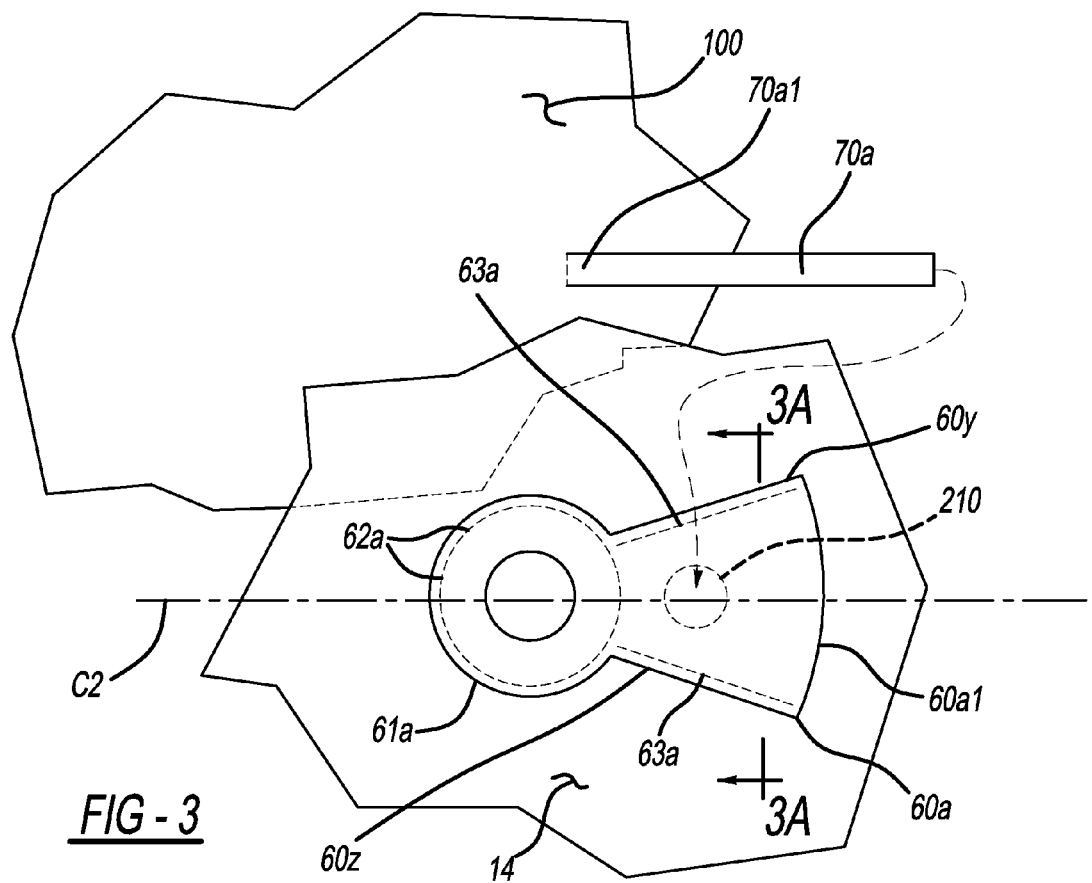
FIG. 3 is an exploded perspective view of a portion of an airbag divider and an associated vent hole lid member attached thereto by a tether member, in accordance with an embodiment described herein.
Figure 3A:
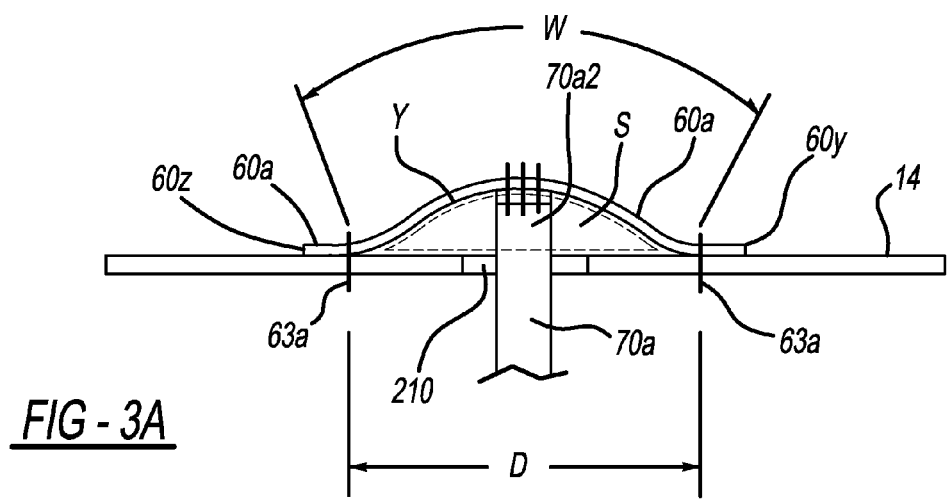
FIG. 3A is a cross-sectional view of a patch member, vent hole lid member and tether member as shown in FIG. 3 attached to an airbag panel, in accordance with an embodiment described herein.

Referring to FIGS. 3 and 3A, in one particular embodiment of the lid members 60a and 60b and their associated attachment structures, the lid members include or are connected to associated patch members 61a and 61b, each formed of an annular woven, gas-impermeable cloth or other suitable material and attached to the peripheral edge of associated ones of each of openings 210 and 212 from the outside of the airbag 10. Reference numeral 62a (FIG. 3) designates an associated seam stitching the patch member 61a to left panel 14. A similar seam 62b (not shown in FIGS. 3 and 3A stitches the patch member to right panel 16. Each of seams 62a and 62b extends into annular shapes along the outer periphery of its respective patch member.

Attachment of the patch member 61a and operation of the associated lid member 60a on left panel 14 will be described in the following paragraphs. However, it is understood that attachment of the patch member 61b and operation of the associated lid member 60b on right panel 16 is the same as for patch member 61a and lid member 60a.

The vent holes, lid members and associated structures used in the embodiments described herein for controlling gas flow out of the airbag through the vents, are configured according to one of the embodiments described in U.S. Pat. No. 7,607,690, which is incorporated herein by reference in its entirety. However, other configurations of vent holes, lid members and associated structures are also contemplated.

As shown in FIG. 3, a pair of side edge portions 60y and 60z of the periphery of the lid member 60a extends from the outer peripheral edge of the patch member 61a. The pair of side edge portions 60y and 60z is connected to the left panel 14 via the seams 63a. The respective seams 63a are joined to the seam 62a stitching the patch member 61a to left panel 14. The side edge portion 60a-1 on the distal end side of the lid member 60a is not connected to the left panel 14. The vent hole 210 is positioned between the seams 63a.

FIG. 3 shows an axis C2 bisecting patch member 61a and a cross-section 3A-3A taken through the patch member and perpendicular to axis C2. Referring to FIGS. 3 and 3A, in the embodiment shown, a distance D between a stitch position of one of the side edge portions 60y and 60z of the patch member 61a on one side of axis C2 and a stitch position of the other one of side edge portions 60y and 60z on an opposite side of axis C2, in a state in which the left panel 14 is extended flatly, is less than a distance W between the positions of the stitches on the patch member along the cross-section, when the patch member 61a is extended flatly. Therefore, even when the left panel 14 is extended flatly as shown in FIG. 3A, the patch member 61a still remains in the sagged configuration shown in the drawing. Thus, when the patch member 61a is not pulled toward the inside of the airbag 10 by the tether member 70a, a space S is formed between the patch member 61a and the left panel 14. However, the configuration of the patch member 61a and the connecting structure with respect to the left panel 14 is not limited thereto. For example, the lid member 60a may be provided separately from the patch member 61a.

A tether member 70a is provided for connecting the lid member 60a to the divider 100. A similarly configured and operating tether member 70b is provided for connecting the lid member 60b to the divider 100.

A first end of the tether 70a is stitched or otherwise suitably attached to divider 100 at location 70a1. A second end of the tether 70a passes through the vent hole 210 and is stitched or otherwise suitably attached at a location 70a2 to a surface of the lid member 60a opposing the vent hole 210. Also, a first end of the tether 70b is stitched or otherwise suitably attached to divider 100 at location 70b1. A second end of the tether 70b passes through the vent hole 212 and is stitched or otherwise suitably attached to a surface of the lid member 60b at a location 70b2 opposing the vent hole 212.

As previously described, tethers 70a and 70b are structured and attached by their ends at respective locations 70a1 and 70b1 on the divider 100 and on their respective lid members 60a and 60b such that the lid members are in a closed condition when the divider is deflected in direction "A" into condition 900 (as shown in FIG. 2A) and the lid members are in an open condition when the divider is deflected in direction "B" into condition 902 (as shown in FIG. 2B).

Referring to FIGS. 2A and 4, in a first operational phase of the airbag, upon collision of a vehicle in which the airbag 10 is installed, a pressurized fluid source (not shown) is activated to inject gas in the airbag 10. During the first phase of airbag deployment, pressurized gas enters and fills upper chamber 102. The pressure within the upper chamber 102 increases such that pressure in upper chamber 102 is greater than pressure in lower chamber 104, which causes the divider to deflect downwards toward the lower chamber 104. In addition, gases flow from the upper chamber 102 through the valve mechanism 113 and opening 112a into lower chamber 104. Because the valve mechanism is structured to permit gases to flow freely from the upper chamber to the lower chamber, the lower chamber 104 rapidly fills with gases received from the upper chamber. During this phase, the vent covers 60a and 60b are held closed by tether members 70a and 70b attached to divider 100. The deflection of the divider maintains tension in the tether members, which maintains the closure of the vent covers 60a and 60b.

Figure 2C:
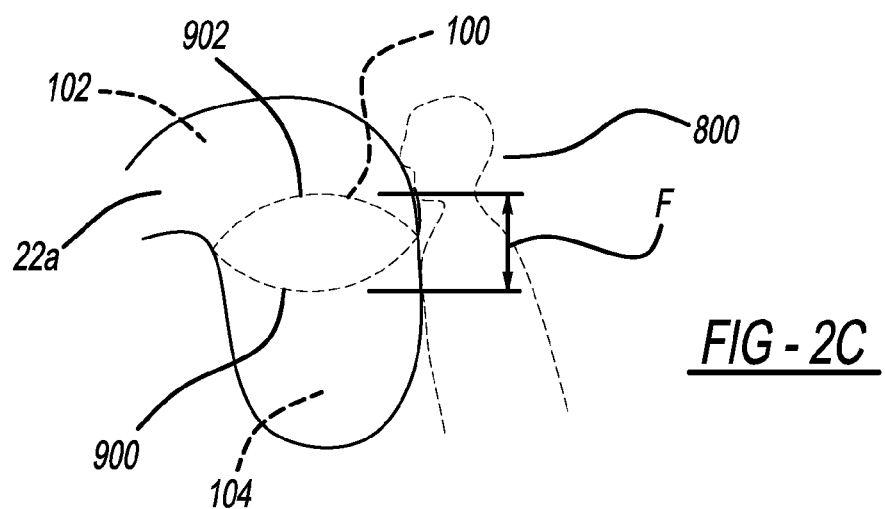
FIG. 2C is a schematic perspective view of the airbag embodiment shown in FIG. 2B.

Referring to FIGS. 2A, 2B, and 2C, in the embodiments of the divider 100 described herein, it is seen that the distance F moved by a given portion of the divider when the divider moves from deflecting into the lower chamber 104 to deflecting into the upper chamber 102, is generally dependent upon the distance D1 along the divider of the given portion of the divider from a portion of the divider which achieves maximum deflection in either of directions A and B (shown in FIGS. 2A and 2B) when the divider is fully deflected during the first or third operational phases of the airbag, as described herein. This portion of the divider is referred to herein as the region C of maximum deflection of the divider 100, and may be determined analytically or experimentally for a given airbag. In general, the region of maximum deflection will depend on such factors as the divider configuration and the positions and configurations of the seams attaching the divider to the panels 12, 14 and 16 (and/or to any other panels to which the divider is attached. In the embodiment shown, the region of maximum deflection C will displace or move a greater distance than any other portion of the divider when the deflection direction shifts from a direction toward the lower chamber to a direction toward the upper chamber. Consequently, a first portion P1 of the divider (FIG. 2B) relatively closer to the region C will displace a relatively larger distance F1, while a second portion P2 of the divider that is located relatively farther from the region C will displace a relatively smaller distance F2. In the embodiment shown, the divider 100 is structured and attached to the airbag outer panels 12, 14 and 16 such that region C lies along a plane M bisecting the airbag and divider. The location and extent of the region of maximum deflection C may be determined analytically or iteratively, through experimentation for a given divider and divider attachment configuration, using known methods.

In the embodiments shown in FIGS. 2A-2C, the flowrate of gases through the vent openings 210 and 212 may be controlled by controlling the distances of the lid members 60a and 60b from their corresponding vent holes 210 and 212. For example, as seen from FIG. 3A, as the distance of a lid member (or a portion of a lid member) from the opening increases, the area of a region Y (indicated by the dashed line in FIG. 3A) bounded by the outer edge of the lid member and the portion of the airbag panel 14 surrounding the vent hole 210 correspondingly increases. This allows a relatively larger flowrate of gases from the airbag interior through the vent hole 210 and into the area Y.

In a particular embodiment, the differing displacements of the different portions of the divider during the airbag internal pressure shifts may be used to control the amounts by which the vents are opened, by attaching the tethers to suitable locations along the divider. That is, if one or more of tethers 70a and 70b are attached to the divider 100 relatively closer to the region C, the attachment point(s) of these tethers will experience a relatively greater displacement during deflection of the divider, thereby permitting the vent cap(s) 60a and 60b attached to the tethers to open a relatively greater amount and providing a relatively greater area for region Y. This enables a relatively greater gas flowrate through the vent(s). Similarly, if one or more the tethers are attached to the divider 100 relatively farther from the region C, the relatively smaller displacement of the outlying portions of the divider will permit the vent cap(s) 60a and 60b attached to the tethers to open only a relatively smaller amount, thereby providing a relatively smaller area for region Y and permitting a relatively lower gas flowrate through the vent(s). In a particular embodiment, tethers 70a and 70b are attached to the divider 100 at the region of maximum deflection C.

In addition, the amount of material forming the divider 100 may be adjusted to some degree to correspondingly adjust the maximum amount or distance the region C deflects in either direction (toward the lower chamber 104 or toward the upper chamber 102). Referring to FIG. 2A, if the divider 100 is formed using a relatively smaller amount or length L of material (where the dimension L is measured when the divider is laid flat on a flat surface), the region C will deflect a relatively smaller amount in response to an applied pressure to either side of the divider. If the divider 100 is formed using a relatively larger amount or length L of material, the divider region C will deflect a relatively greater amount into one of the upper chamber or the lower chamber in response to an applied pressure. This method of controlling the relative degree of the divider deflection may also be used to correspondingly control the amount which the vent covers 60a and 60b open as previously described, with a divider using a relatively larger amount of material (and having a correspondingly greater deflection) enabling a relatively greater opening area Y (FIG. 3A) to be produced during deflection of the divider in direction B. One or more of the design parameters described above may be adjusted as described to control valve actuation, according to the requirements of a particular application. In more particular embodiments in which the region C lies along a plane M bisecting the airbag and divider, each of divider attachment locations 70a1 and 70b1 is positioned within a range extending 60 millimeters inclusive along the divider to either side of plane M. That is, the dimension D1 as seen in FIG. 2A extends up to 60 mm to each side of plane M. It has been found that positioning of the tether attachment locations within this range of locations is especially effective and reliable in securing the vent covers 60a and 60b in a closed condition when the divider is fully deflected toward lower chamber 104, and also in enabling the vent covers to be rapidly and fully opened when the divider is fully deflected toward upper chamber 102.

Referring to FIG. 5, during a second phase of airbag deployment, pressurized gases continue to be transferred from the upper chamber 102 into the lower chamber 104, until pressure equilibrium between the upper and lower chambers is reached. This pressure equilibrium may be reached just before contact of the torso of the vehicle occupant 800 with the airbag, or the gas may continue to flow into the lower chamber at least until contact with the occupant. Initially, the occupant contacts the airbag in a region exterior of the lower chamber 104. While the divider 100 is fully deflected in direction "A" toward the lower chamber 104, tension in the tether members 70a and 70b maintains closure of the vent covers as shown in FIG. 2A. When pressure equilibrium is reached, the divider 100 may be substantially planar or otherwise have no pronounced deflection toward either upper chamber 102 or lower chamber 104. Thus, the tension in tethers 70a and 70b maintaining vent covers 60a and 60b in the closed condition may be relaxed to some degree immediately prior to contact of the vehicle occupant with the airbag.

In addition, impact by the occupant torso begins to increase the pressure in the lower chamber (i.e., the contact begins to reverse the previous pressure differential between the upper and lower chambers, causing the deflection in direction "A" to diminish responsive to occupant impact with the airbag).

Referring to FIGS. 2B and 2C, during a third phase of phase of airbag deployment, impact by the occupant torso begins to increase the pressure in the lower chamber (i.e., the contact begins to reverse the previous pressure differential between the upper and lower chambers, causing the deflection in direction "A" to diminish responsive to occupant impact with the airbag). As the torso of the occupant 800 continues to press on the airbag exterior outside lower chamber 104, the pressure in the lower chamber increases to where the lower chamber pressure exceeds the upper chamber pressure. This shift reverses the direction of divider deflection, from direction "A" to direction "B", wherein the divider is deflected toward upper chamber 102. The relatively higher pressure in the lower chamber 104 also causes flow-restricting valve mechanism 113 to close or otherwise actuate so as to restrict gas flow from the lower chamber 104 back into the upper chamber 102, thereby maintaining the elevated pressure in lower chamber 104. As the divider deflects in direction "B", the tension in tether members 70a and 70b (which was maintaining closure of the vent covers) is reduced. This reduced tension allows the vent covers 60a and 60b to open, thereby permitting release of pressurized gas from the upper chamber via openings 210 and 212 responsive to contact of the vehicle occupant's head with the portion of the airbag exterior of upper chamber 102, and softening or reducing the contact forces between the bag and the passenger's head. Stated another way, contact between the passenger's torso and the airbag exterior of the lower chamber 104 acts to increase pressure in the lower chamber and produce deflection of the divider toward the upper chamber 102. This deflection moves the anchor locations 70a1 and 70b1 of the tethers toward the vents 210 and 212, thereby permitting the lid members 60a and 60b to open and gases to exit the upper chamber 102 through the vents responsive to contact of the passenger's head with the airbag exterior of the upper chamber 102. Thus, when the vehicle occupant's head contacts the airbag exterior of the upper chamber, the contact between the passenger's head and the airbag is softened.

In a particular embodiment, the airbag is structured such that the occupant's torso makes contact with the airbag exterior of the lower chamber before the occupant's head makes contact with the airbag exterior of the upper chamber. For example, the airbag may be structured such that the portion of the bag exterior of the lower chamber 104 extends outwardly toward the occupant's torso when inflated, so that as the torso pivots and moves forward during a collision event, the lower portion of the torso contacts the airbag. This increases the pressure in lower chamber 104, thereby deflecting the divider toward the upper chamber and actuating the valve 113 to restrict backflow into the upper chamber 102 as previously described. Thus, in this embodiment, prior to contact of the occupant's head with the airbag, the divider is fully deflected toward the upper chamber due to pressure exerted on the lower chamber by the torso.

In particular embodiments, holes 210 and 212 are circular and have diameters in the range 20-75 millimeters inclusive. In a particular embodiment, the holes 210 and 212 have diameters of 40 millimeters. However, the vent hole dimensions necessary to provide a desired airbag performance for a particular application may be determined analytically or iteratively, through experimentation, using known methods.

In particular embodiments, the characteristics of features such as the optimum lengths of tethers 70a and 70b, the optimum locations along divider 100 at which the tethers may be attached, the optimum divider length L, the optimum sizes of vent holes 210 and 212, and other pertinent parameters may be specified so that the flowrate of gases exiting one of openings 210 and 212 is different from the flowrate of gases exiting the other one of openings 210 and 212. This enables the deflation rates of different portions of upper chamber 102 to be adjusted or tuned to meet particular performance requirements.

Features such as the optimum lengths of tethers 70a and 70b, the optimum locations along divider 100 at which the tethers may be attached, the optimum divider length L, the optimum sizes of vent holes 210 and 212, and other pertinent parameters may be determined analytically or iteratively, through experimentation for a given application using known methods.

Referring again to FIG. 1, in addition to openings 210 and 212 which are closable by lid members 60a and 60b, one or more optional pressure relief openings 802 and 804 may also be provided along each of a respective one of side panels 14 and 16. Openings 802 and 804 are configured and located on the airbag so as to be always in an open condition. While holes 210 and 212 are only opened responsive to contact between the airbag and a passenger, holes 802 and 804 serve as pressure relief openings to prevent excessive internal airbag pressures from developing if lid members 60a and 60b are not actuated to release gases from openings 210 and 212 in time to prevent an undesirable internal airbag pressure. In particular embodiments, holes 802 and 804 are circular and have diameters in the range 30-75 millimeters inclusive. In a particular embodiment, the holes 802 and 804 have diameters of 60 millimeters. However, the pressure relief hole dimensions necessary to provide a desired airbag performance for a particular application may be analytically or iteratively, through experimentation, using known methods.

Figure 6A:
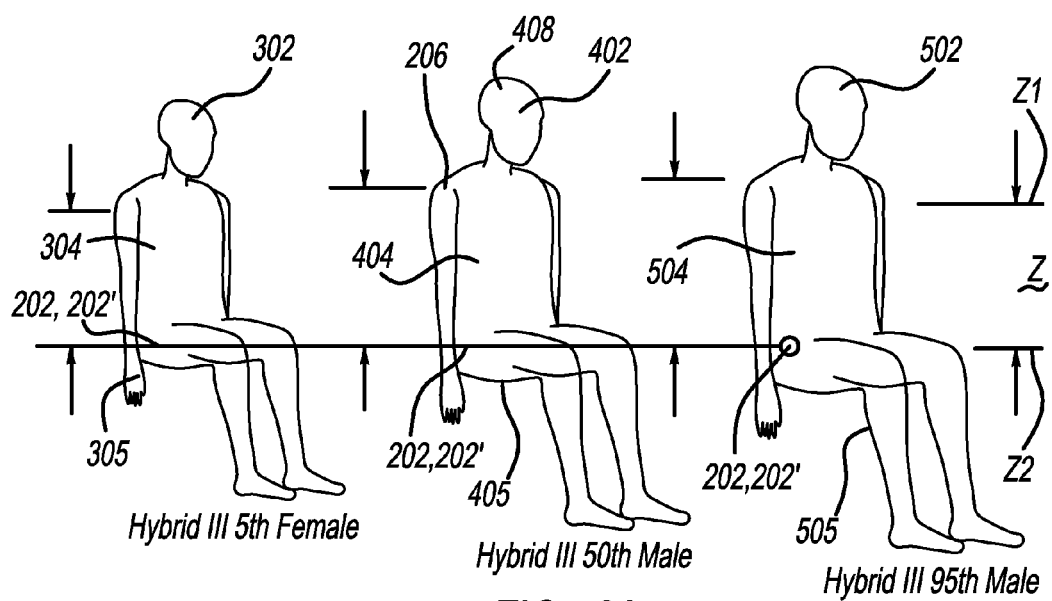
FIG. 6A is a schematic view showing relative proportions of Anthropomorphic Test Devices and relevant parameters used to define the desired positioning of the divider within the airbag, in accordance with embodiments of the present invention.

In particular embodiments described herein, the inflated shapes of the airbag 10 and the divider 100 and the positions of the intersections between divider 100 and the interior portions of the panels 12, 14, 16 to which the divider embodiments are attached are configured so as to ensure that the head and neck regions (collectively designated 302 for a Hybrid III 5th percentile female test ATD 305, 402 for Hybrid III 50th percentile male test ATD 405, and 502 for a Hybrid III 95th percentile male test ATD 505, as shown in FIG. 6A) of passengers of various sizes impact the bag along the exterior of the upper chamber 102 of the bag (i.e., that the upper chamber 102 absorbs the impact of the head and neck regions of the passenger). The configuration of the divider, its positioning within the airbag, and the position of a seam 201 attaching the divider leading edge to the panel 12 enable the cushion to match the forward movement of the relatively heavier thoracic regions (generally designated 304 in ATD 305, 404 in ATD 405, and 504 in ATD 505) to the forward movement of the relatively smaller and lighter head & neck regions 302, 402, 502.

Referring to FIG. 6A, in the embodiment shown in FIGS. 7-9D, the divider leading edge is attached to the main panel along a seam 201 positioned so as to reside within a zone Z defined at a lower end Z2 by the hip pivot 202 of a seated Hybrid III 5th female ATD 305, and at an upper end Z1 by the shoulder pivot 206 of a seated Hybrid III 50th ATD 405, inclusive. These boundary positions and other characteristics of all the test ATD's described herein are specified in 49 CFR Part 572, which is incorporated herein by reference in its entirety, and which may be found, for example, at http://www.gpo.gov/fdsys/pkg/CFR-2011-title49-vol7/pdf/CFR-2011-title49-vol7-part572.pdf, or at http://www.law.cornell.edu/cfr/text/49/part-572. In a particular embodiment, the hip pivot 202 of the seated Hybrid III 5th female ATD resides at a vertical distance of 3.30 inches above the portion of the seat in contact with the ATD, and the shoulder pivot 206 of the seated Hybrid III 50th male ATD resides at a distance of 17.5 inches above the portion of the seat in contact with the ATD. Thus, the dimension of the zone Z is 14.2 inches.

It is noted that the hip pivots of the seated ATD's 305, 405, and 505 are collinear or at the same level, so that the hip pivot of the seated Hybrid III 50th male ATD 405 may be referred to as 202'. This common boundary of the zone Z may also serve as a reference axis. Also, in this embodiment, the portions of the body located above the respective shoulder pivots on ATD's 305, 405 and 505 are considered to define the respective head and neck regions of the ATD's.

Figure 6B:
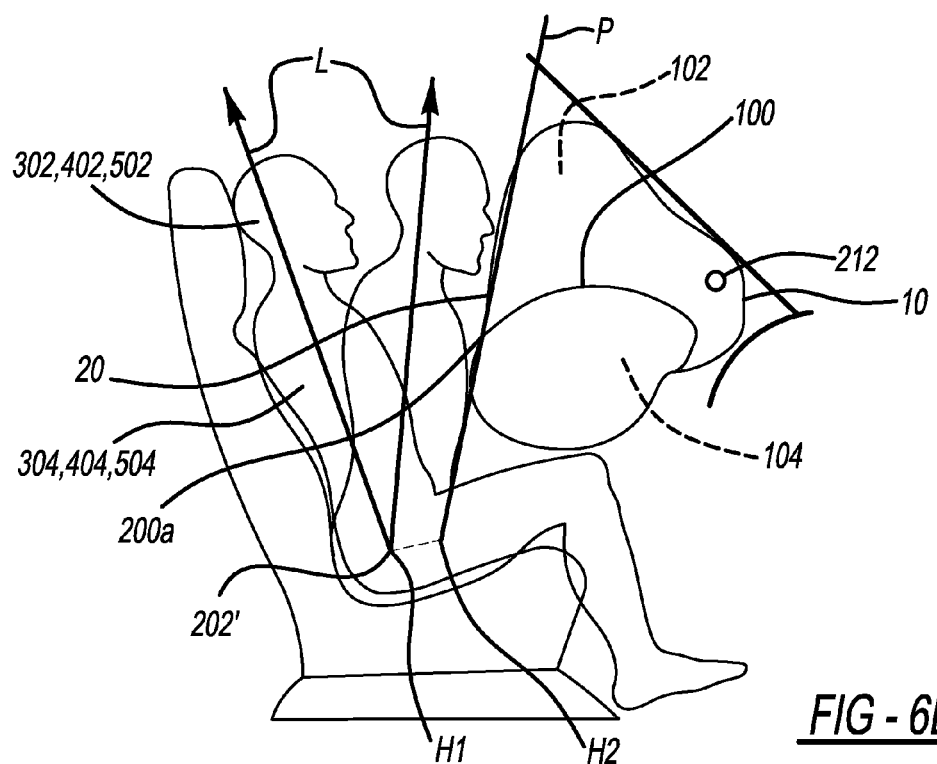
FIG. 6B is a side view of an airbag in accordance with an embodiment described herein mounted and deployed in a vehicle in front of a seated passenger.

In embodiments described herein, the various airbag elements are shaped and connected to each other so that, when fully inflated, the front side 20 of the bag aids in maintaining alignment of the head, neck, and thoracic body regions along a line L as shown in FIG. 6B during impact with the airbag and after contact with the bag. It is desirable to maintain this alignment during and after contact with the bag, so that the entire upper body of the passenger (i.e., the head, neck, and thoracic regions) effectively pivots about the hip axis of the passenger, as shown in FIG. 6B. To this end, as seen in FIG. 6B, the bag is structured such that the portions of the inflated bag front side 20 contacted by the passenger form an essentially flat plane, indicated by the plane P in the drawing. It is also desirable that the line L along which these body regions lie be parallel with the plane P during and after impact with the airbag, to aid in preventing differential motion of the head/neck region and the thorax region (i.e., a bending of the neck and head regions relative to the thorax).

Referring now to FIGS. 7-9D, in particular embodiments, the location of divider opening 112a (and the locations of all other openings, if multiple divider openings are employed) may be determined in a manner similar to that set forth in U.S. application Ser. No. 14/212,701, filed on Mar. 14, 2014, the disclosure of which is hereby incorporated by reference in its entirety.

Referring to the embodiment shown in FIGS. 7-9D, it has been found that airbag performance after activation and during filling is affected by the horizontal distance D10 taken between a vertical plane P10 extending through the seam 205 (where the divider 100 is attached to the main panel 12 adjacent the airbag mouth 22a) when the airbag is deployed in a vehicle in a fully inflated state, and the location(s) of any edge(s) of opening 112a closest to the plane P10 when the airbag is in the inflated state. The distance D10 may be taken as the shortest distance between plane P10 and a vertical plane P9 passing through the closest edge(s) of opening 112a (or through the closest edge of any opening if multiple openings are used) when the airbag is in the inflated state.

More specifically, if any edges of any divider openings are located closer to the plane P10 than a predetermined distance 1000f (as defined by a vertical plane P15) from plane P10, the movements of the components of valve mechanisms controlling gas flow through the divider openings may be constricted by proximity to the vehicle instrument panel profile, thereby impairing valve operation.

Figure 7:
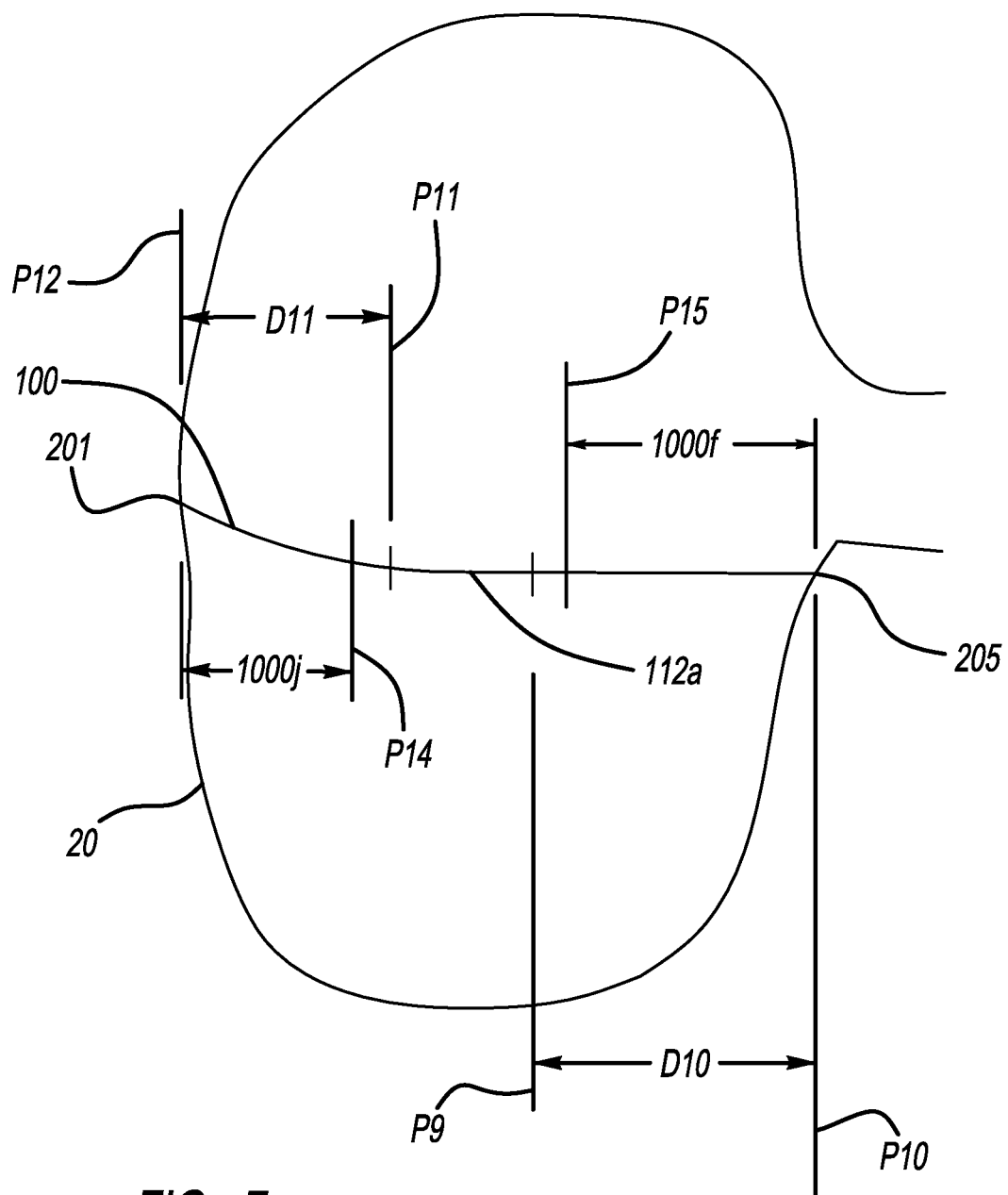
FIG. 7 is a schematic side view of an airbag in accordance with another embodiment described herein.

Airbag performance after activation and during filling is also affected by the distance D11 between a vertical plane P12 passing through a seam 201 (along which divider 100 is attached to occupant contact face 20 of the airbag) when the airbag is in a fully inflated state (as shown in FIG. 7), and the location(s) of any edge(s) of divider opening 112a (or any other divider opening(s)) closest to the plane P12 when the airbag is in the inflated state. The distance D11 may be taken as the shortest distance between plane P12 and a vertical plane P11 passing through the closest edge of any divider opening when the airbag is in the inflated state. More specifically, if any edges of any divider openings are located nearer to the occupant contact side 20 of the cushion than a predetermined distance 1000j (defined by a vertical plane P14) from the occupant contact side (as measured from the plane P12, the airbag will have a tendency to pull excessively downward during inflation of the upper chamber 102, thereby pulling the airbag out of the desired alignment with the passenger's body prior to contact between the passenger and the inflating airbag.

Thus, at locations along the divider between planes P14 and P15 is an interval or zone in which the divider openings 112a (or openings) should be positioned to achieve sufficient gas flow to rapidly fill lower chamber 104 without having the upper chamber pressure becoming too high to meet the NHTSA airbag performance requirements for an out-of-position 3 year old or 6 year old child, evaluated for position-1 (as shown in FIGS. 9A-9D). By positioning the opening(s) and associated valve mechanism(s) within the range defined by locations 1000j and 1000f, the force exerted by the inflated airbag on position 3 & 6 year olds in position-1 will be equally divided between the child's head and thorax regions.

While movement of the edge(s) of the divider openings past the distance 1000*j* farther away from the front portion of the main panel 12 mitigates excessive downward pull of the airbag during the initial stages of inflation, thereby improving the overall performance of the bag with respect to an adult occupant, this positioning of the opening(s) may result in less-than-optimum performance for Out of Position-1 children. There is a balance between these requirements which may be tuned for a specific vehicle or specific application in order to achieve the best overall performance both early and later in the deployment event, and for both types of passenger. Between planes P14 and P15 lie optimal locations for the divider openings, to tune the initial cushion fill and cushion pitch to achieve the desired results for a given application. The exact desired location of the divider opening (or openings) for a particular application may be determined iteratively, by experimentation, or analytically.

In particular embodiments of the airbag, it is desired to position the divider opening(s) along the divider 100 so that, during inflation, the airbag reacts with a child passenger in a predetermined manner. More specifically, the divider are positioned along the divider such that, as the upper chamber 102 fills in the initial stage of deployment, the bag upper chamber 102 inflates above the top of the head 700*a* of a Hybrid III 3 and 6-Year Old Anthropomorphic Test Device (ATD) (generally designated 700) when the head is positioned resting against or proximate the vehicle instrument panel 213 at a location specified as Position-2 for Out of Position (OOP) testing in accordance with FMVSS Standard No. 208 (which may be found, for example, at http://www.law.cornell.edu/cfr/text/49/571.208), which is incorporated herein by reference in its entirety. The Hybrid III 3 and 6-Year Old test ATD has physical parameters defined by 49 CFR Part 572 (which may be found at http://www.law.cornell.edu/cfr/text/49/part-572), 49 CFR Part 572, Subpart I (which may be found at http://www.law.cornell.edu/cfr/text/49/part-572/subpart-I), and 49 CFR Part 572, Subpart C (which may be found at http://www.law.cornell.edu/cfr/text/49/part-572/subpart-C), all of which are which is incorporated herein by reference in their entireties. Position-1 and Position-2 for Out of Position testing are schematically illustrated in FIGS. 9A-9D (Position 1) and FIGS. 8A-8B (Position 2), and described in sections 22.4.2 and 22.4.3 of FMVSS208, respectively, the descriptions of which are herein incorporated by reference.

As gases flow into the lower chamber 104 from the upper chamber 102, the lower chamber 104 inflates in the later stages of deployment so as to occupy a space behind and around the child's head, thereby preventing and/or mitigating harmful interactions between the airbag and the child's head. This inflation progression is shown in FIGS. 8A and 8B.

The values of D10, D11, 1000*f*, 1000*j* and other divider opening positioning parameters are determined as a function of the vehicle interior dimensions and the placement of the out-of-position-2 child, according to the previously-mentioned FMVSS208 standards. Practical limitations of the divider opening placement affect the airbag performance for an out-of-position 3-year old or 6-year old child, as defined by FMVSS Standard No. 208. By positioning the divider opening(s) within the range defined by locations P14 and P15 (i.e., zone Z3) in FIGS. 8A and 8B, the forces exerted by the airbag on both the 3-year old and 6-year old child in Position-1 (shown in FIG. 9A) will be distributed between the child's head and thorax regions. For example, it has been found that when the divider openings are positioned within a distance 1000*j* from a seam connecting the divider 1000 with the occupant side of the airbag, the airbag will tend to impact the child when deployed, before completely filling. This contact with the child tends to prevent the gases from flowing into the lower chamber, which may produce greater forces acting on the child. See FIG. 9B that illustrates this configuration, for example. Also, it has been found that when the divider openings are positioned within a predetermined distance 1000*f* along the divider from an inflator side 22 of the airbag toward an occupant side of the airbag, the airbag will tend to impact the child when deployed, before completely filling, with the results previously mentioned. In contrast, referring to FIGS. 9C and 9D, it has been found that when the divider opening(s) are positioned within zone Z3 as previously described, the gases are permitted to flow into the lower chamber without obstruction. This creates a more evenly distributed loading on the child's head and thoracic regions. Also, with this placement of the divider openings and associated valves, the gases can more easily flow out of the vent holes 210 and 212 from the upper chamber. As illustrated in FIGS. 8A and 8B, P15 is defined by alignment with the out-of position 2 leading edge of the child's head on the instrument panel 213 (per FMVSS208). P14 is aligned with the shoulder bolt 701 of the ATD. Z3 is of course defined as the region spanning between P14 and P15.

Figure 9A:
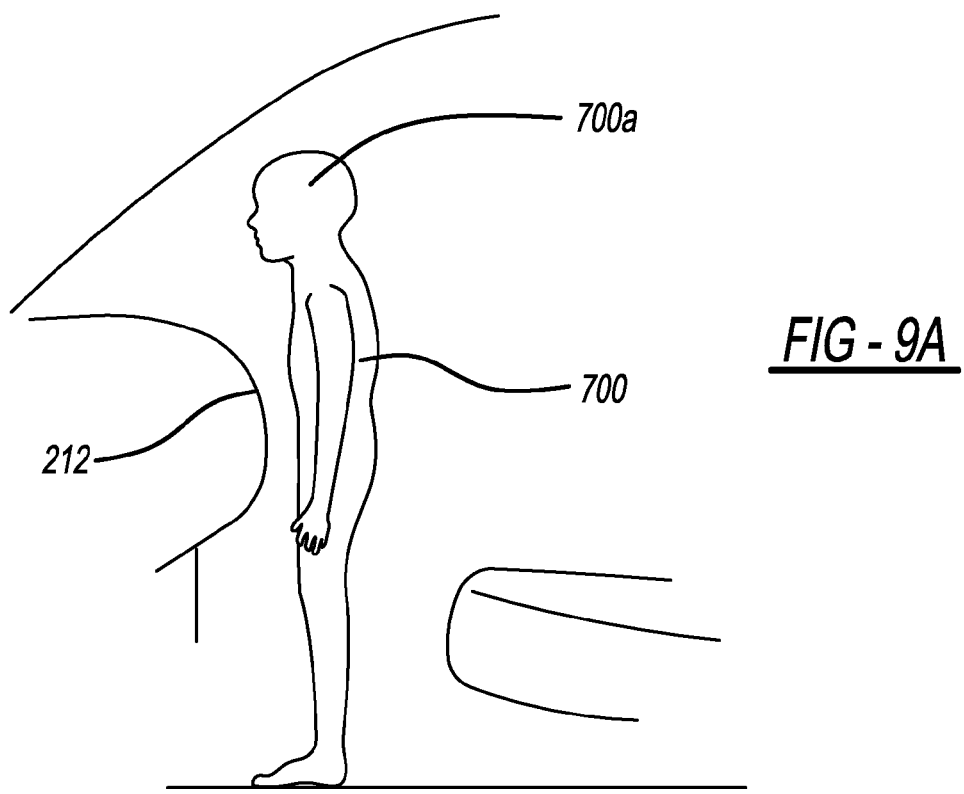
FIG. 9A is a schematic side view of a 3 year-old Anthropomorphic Test Device in Position-1 for Out of Position testing under FMVSS Standard No. 208, prior to activation of a vehicle airbag.
Figure 9B:
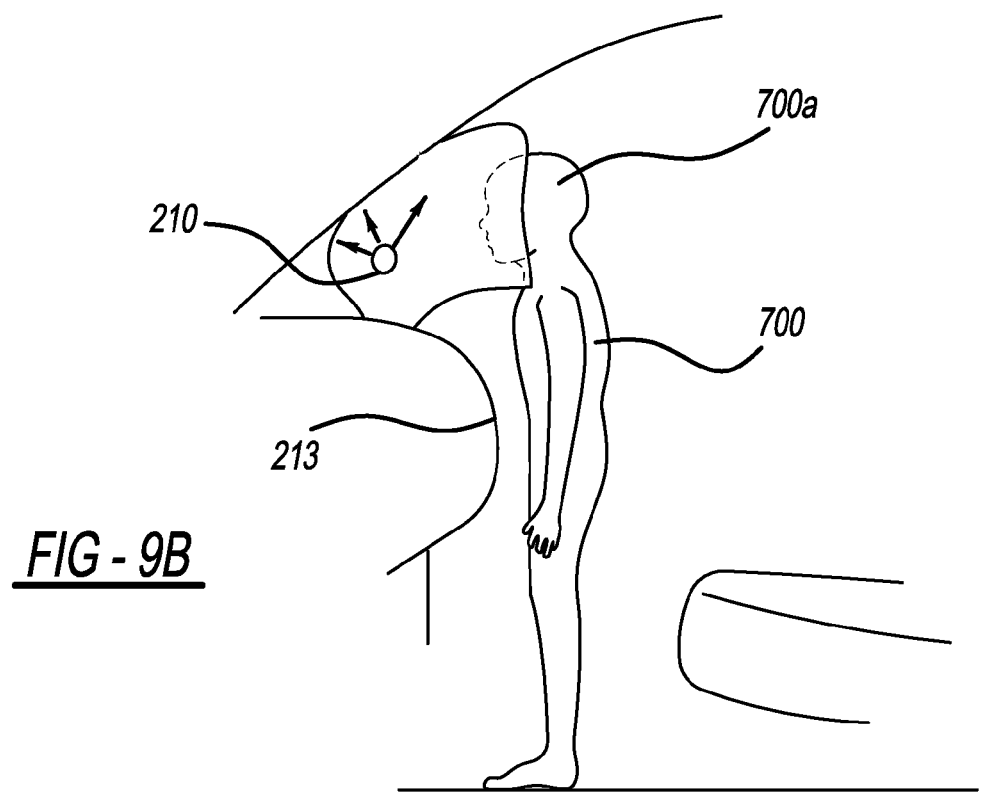
FIG. 9B is a side view of FIG. 9A after activation of a vehicle airbag illustrating an undesired location of a divider opening and associated valve mechanism at a point rearward from the occupant or proximate the inflator.
Figure 9C:
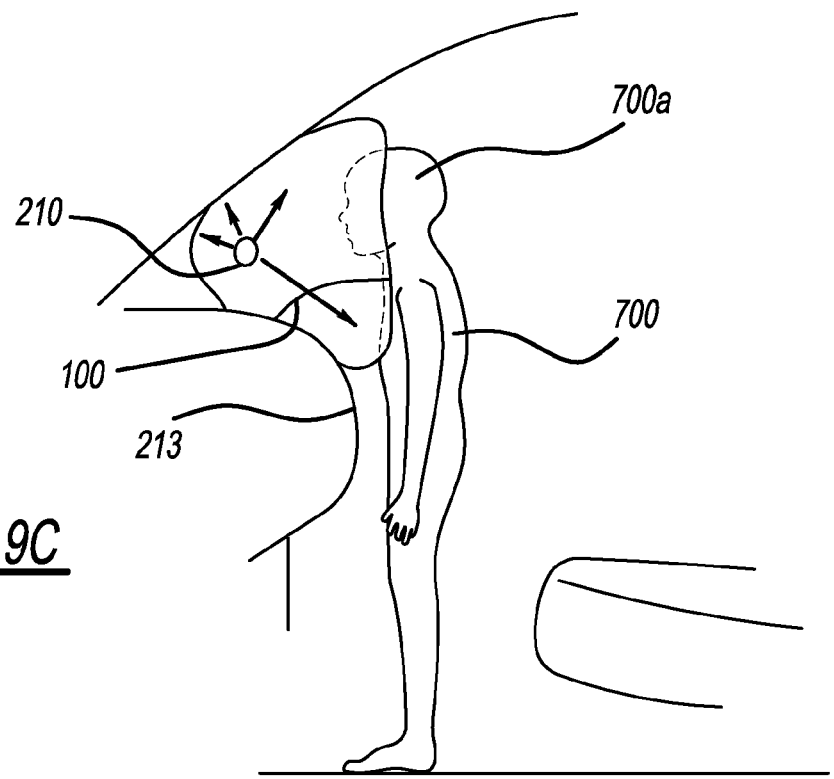
FIG. 9C is a side view of FIG. 9A after activation of a vehicle airbag.
Figure 9D:
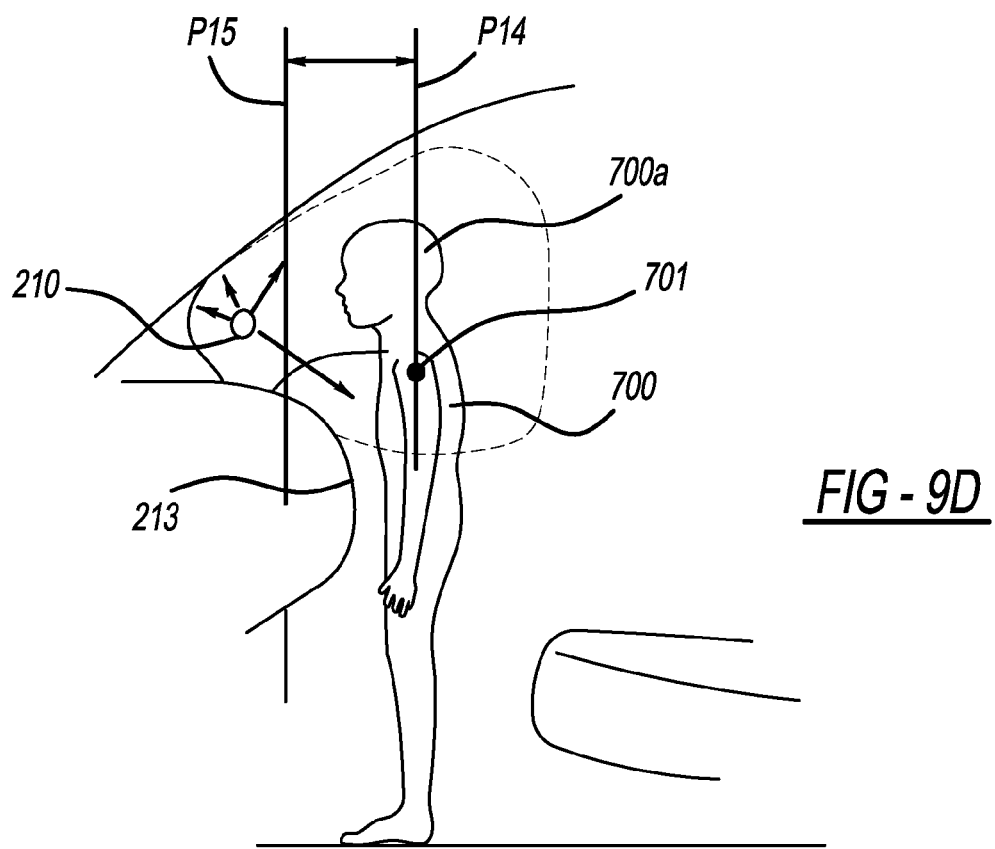
FIG. 9D is another side view of FIG. 9A after activation of a vehicle airbag illustrating the determination of zone 3 (Z3), and a desired location of the divider openings and associated valve mechanisms.

Further to FIGS. 9C and 9D, it should be appreciated that the location(s) of the divider opening(s) and any associated valve mechanism(s) are preferably positioned within Z3 as defined in the deployed airbag. Accordingly, it will be appreciated that, as described in the examples given below, the out-of-position 1 and out-of-position 2 FMVSS208 defined above are particularly important in certain embodiments with regard to placement of the divider openings. It has unexpectedly been found that placement of all the divider openings within zone 3 or Z3 as defined herein and with reference to a deployed airbag shown in FIG. 9D for example, contributes to effectively managing and mitigating the forces acting on an out-of-position child for example, as indicated in 3-year old and 6-year old HAI ATD testing under FMVSS208. It will be appreciated that although at least one or more openings 112*a* should be positioned within Z3 to ensure fluid communication between the upper and lower airbag chambers with regard to airbag contact with an out-of-position child as shown in FIG. 9A (position 1 of FMVSS208), one or more divider openings may also be positioned outside of Z3 depending on other design criteria.

Figure 8B:
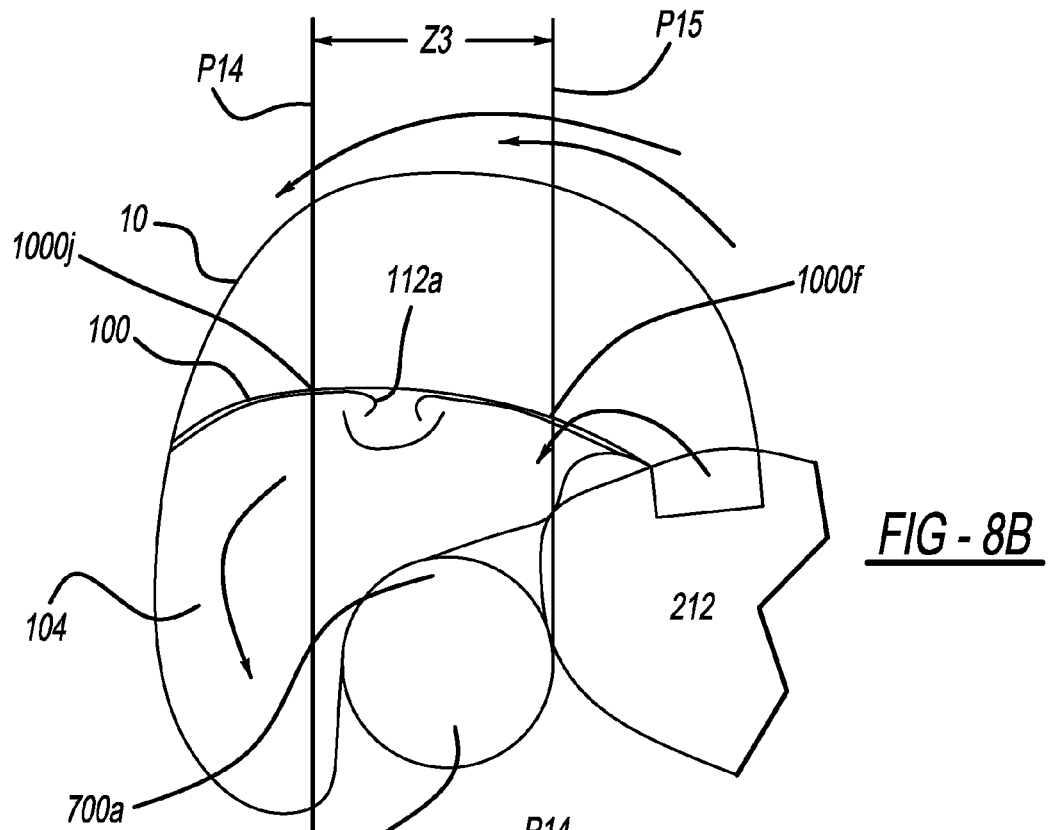
FIG. 8B is a schematic side view of the airbag of FIGS. 7 and 8A showing a later stage of inflation of the airbag.
Figure 8A:
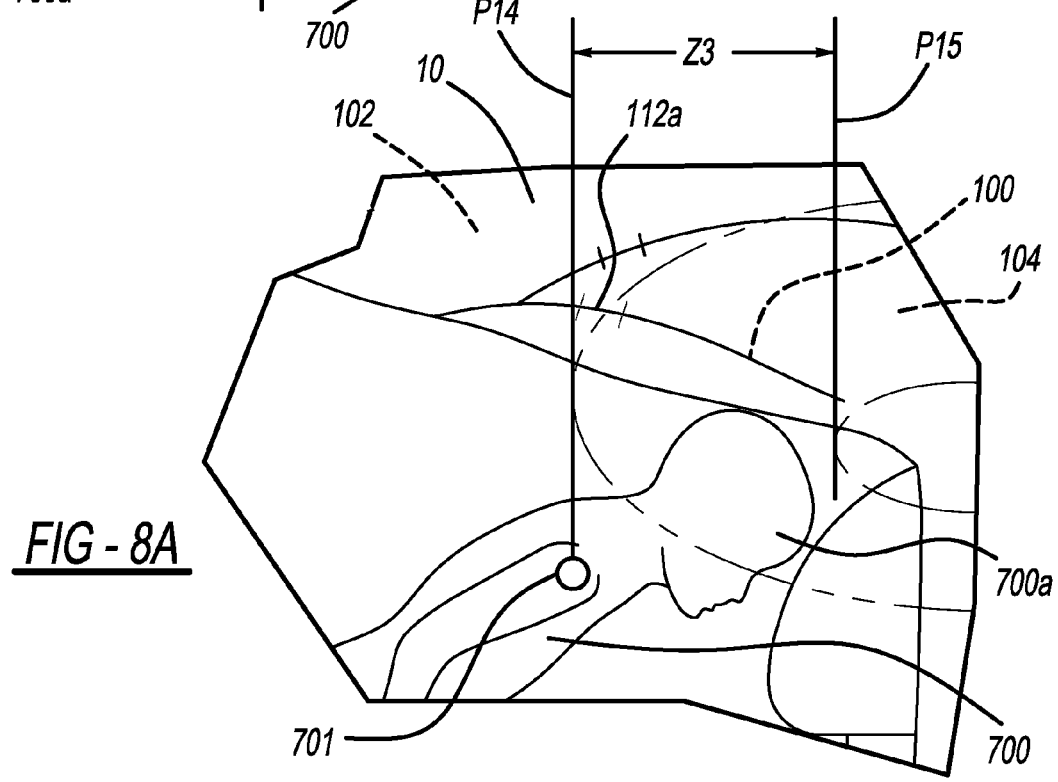
FIG. 8A is a schematic side view of a portion of the airbag shown in FIG. 7 in the initial stages of inflation, showing locations of the inter-chamber venting opening(s).

Stated another way, it has been found that an optimum inflation profile range and alignment with the passenger's body as shown in FIG. 6B, as well as the bag inflation progression shown in FIGS. 8A and 8B, can be achieved by positioning all divider openings such that all edges of all the openings reside within the zone Z3 bounded by planes P14 and P15 as defined herein, which may also be defined on one side by a vertical plane P15 shown in FIG. 8A corresponding to a location abutting the front-most portion of the head of the Hybrid III 6-Year Old Anthropomorphic Test Device when the head of the Hybrid III 6-year old is in Position-2 for FMVSS208 Out of Position testing as specified above, and on an opposite side by a vertical plane P14 (see FIG. 8A) as defined herein. As known in the pertinent art, an anthropomorphic test device is a human form in shape, mass and mechanical response, equipped with sensors including accelerometers, deflection sensors and other measurement devices, to simulate the performance of the human body. It is used in the assessment of injury potential in vehicle safety testing. In one embodiment, plane P14 is spaced apart approximately 7 inches from plane P15 toward a rear of the vehicle when the airbag is inflated. This effectively positions the divider opening(s) within a zone enclosing the head of the Hybrid III 6-Year Old ATD as the airbag inflates over the head of ATD as shown in FIG. 8B. The distance between planes P15 and P14 defines a zone Z3 in which the opening 112a may be positioned.

In particular embodiments, the tether attachment locations 70a1 and 70b1 previously described are also positioned within the zone Z3. This facilitates the desired airbag response with respect to children in FMVSS208 Positions 1 and 2 as previously described.

It has also been found that a total area of the divider opening 112a (or openings) within a range of 700 square millimeters (achievable using, for example, one opening of approximately 15 mm radius) to 32,000 square millimeters (achievable using, for example, one opening of approximately 100 mm radius opening) is desirable for helping to ensure that airbag performance is within an optimum range. In embodiments of the present invention, which use a directional valve mechanism to facilitate inflow and restrict backflow from the lower chamber to the upper chamber as previously described, the total areas of the divider openings may need to be at or near an upper end of this range of opening sizes 700 to 32,000 square millimeters, to provide the necessary inflation profile given the reduction in flow caused by turbulence and friction in the gases as they flow through the opening(s) and interact with the portions of the valve.

In one embodiment, the opening 112a (or openings) are circular. However, the opening(s) can have any desired shape, as long as the total area of the opening(s) is within the range specified above, and as long as all of the opening edges are positioned within the zone defined above.

In addition, the number of divider openings and the optimum size(s) of the opening(s) formed in divider 100 for a particular application may be determined based on the type of vehicle collision pulse and interior geometry of the vehicle in which the airbag is installed, the desired fill rate of the airbag, the volume ratio, the type of directional valve used, the overall dimensions and curvature of the instrument panel 213, and other pertinent factors. The size(s) and position(s) of the divider opening(s) as described herein facilitate smooth and rapid transfer of inflation gases from the upper chamber to the lower chamber during initial stages of airbag filling. Once equilibrium is substantially reached between the upper and lower chamber pressures, flow from one chamber to the other is reduced. As the occupant begins to load the lower chamber of the cushion, the pressure within the lower chamber increases, causing the operating member of the valve to restrict the backflow of gas from the lower chamber to the upper chamber. This restricted flow now is effectively absorbing energy from the occupant interaction with the bag lower chamber. The flow restriction can also be adjusted or tuned in order to absorb the occupant energy as required for a particular application. Each of the directional valves (not shown) controlling flow from the upper chamber to the lower chamber can have a single operating member which provides both a desired inflow (to the lower chamber) and a desired backflow (back from the lower chamber) characteristic, or the valve can have one operating member for controlling inflow to the lower chamber and another operating member to control backflow from the lower chamber. In the later phases of the occupant loading of the cushion, backflow from the lower chamber may go into the upper chamber, from where it is discharged into the environment through the vent holes 210 and 212 located in the wall of the upper chamber.

In the case of an Out of Position child in accordance with the FMVSS208 Position-2 testing standard, the initial stages of the cushion deployment development remain the same as described above. However, the gas flow from the upper chamber into the lower chamber as regulated by the divider valve mechanism may be different when a child interacts with the cushion. In the case of the Out of Position-2 child, the volume of the lower chamber is decreased due to the space occupied by the Out of Position Child. The divider valve mechanism continues to permit the flow of gases from the upper chamber into the lower chamber. However, the valve mechanism may also allow the gas to continue to flow into the lower chamber until the cushion's lower chamber and upper chamber internal pressures are in equilibrium, thereby stabilizing the interaction between the cushion and the out of position child. The divider structure and attachment to the airbag outer shell panels, the divider valve mechanism(s) and the airbag main vent designs may be structured to facilitate rapid transition of this state of equilibrium into an adaptive state, wherein the cushion changes from a state of gas flow into the lower chamber to a state where the gas flow is increased out of the main vents (located in wall(s) of the upper chamber) into the environment. This increased flow out of the cushion allows for decreased pressure within the upper chamber and then allows for the backflow of gases from the lower chamber back into the upper chamber and out of the vent openings 210 and 212 into the environment. This adaptability of the valve mechanisms to regulate the flow communication between the two chambers is important for the protection of adult and child occupants.

An airbag and an occupant protection system for an automotive vehicle containing the airbag, wherein the airbag is made in accordance with the method given above, are also contemplated in accordance with the present invention. The passenger side airbag for each unique vehicle may therefore be designed by iteratively reconciling the requirements of FMVSS208 with the present airbag design for each vehicle.

Referring now to FIG. 10, any of the airbag embodiments described herein may be incorporated into an airbag system 200. Airbag system 200 includes at least one airbag 10 in accordance with an embodiment described herein and a gas source 915 incorporated into or operatively coupled to airbag 10 so as to enable fluid communication with an interior of the airbag. Airbag 10 may be mounted in a vehicle dashboard 211 or another suitable portion of the vehicle. Airbag system 200 may also be in communication with a crash event sensor 210 operating in association with a known crash sensor algorithm that signals actuation of airbag system 200 in the event of a collision.

Referring again to FIG. 10, an airbag in accordance with an embodiment described herein or an airbag system 200 including such an embodiment may also be incorporated into a broader, more comprehensive vehicle occupant protection system 180 including additional elements such as a safety belt assembly 150. FIG. 10 shows a schematic diagram of one exemplary embodiment of such a protection system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667, 161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, which are incorporated herein by reference, provide illustrative examples of pretensioners actuated in such a manner.

It is important to note that the construction and arrangement of the airbag, valve, and tether embodiments as shown and described herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

In addition, airbags having the same exterior dimensions and structure may be used for multiple applications, because variations in airbag performance characteristics due to design requirements may be achieved by modifying the interior structure of the airbag (for example, by changing the location of the divider, by modifying the flow characteristics of the various valve embodiments connecting the upper and lower chambers, and by changing the upper chamber vent locations and characteristics). This ability to use a common exterior structure provides a degree of uniformity in bag design and manufacturing.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. An airbag comprising:
   an outer shell defining an interior;
   at least one vent opening structured to enable fluid communication between the interior and an exterior of the airbag;
   a divider dividing the airbag interior into an upper chamber and a lower chamber separate from, and in fluid communication with, the upper chamber; and
   a vent cover for covering said vent opening, said vent cover operatively coupled to the at least one vent opening and to the divider wherein said vent cover is opened based on a predetermined position of the divider.

2. The airbag of claim 1 wherein the lower chamber is structured to cushion the torso, but not the head, of a vehicle occupant.

3. The airbag of claim 1 further comprising an inter-chamber venting system operatively coupled to the divider, the venting system being structured to permit gas to flow unobstructed from the upper chamber through the divider into the lower chamber, the venting system being structured to restrict gas backflow from the lower chamber into the upper chamber.

4. The airbag of claim 3 wherein the venting system is structured to close so as to restrict backflow from the lower chamber into the upper chamber responsive to pressure exerted on the airbag by a torso of the occupant prior to contact between the airbag and a head of the occupant.

5. The airbag of claim 1 wherein the divider is structured to open the vent cover when a pressure in the lower chamber is greater than a pressure in the upper chamber.

6. The airbag of claim 1 further comprising a tether operatively connecting the divider to the vent cover such that deflection of the divider in a first direction acts to pulls the vent cover into a closed condition, thereby restricting flow of gas through the at least one vent opening.

7. The airbag of claim 6 wherein the tether operatively connects the divider to the vent cover such that deflection of the divider in a second direction enables the vent cover to open responsive to gas pressure within the upper chamber, so as to permit an unobstructed flow of gas through the at least one vent opening.

8. A vehicle occupant protection system comprising an airbag in accordance with claim 1.

9. An airbag system comprising an airbag in accordance with claim 1.

10. A vehicle including an airbag in accordance with claim 1.

11. An airbag comprising:
    an outer shell defining an interior;
    at least one vent opening structured to enable fluid communication between the interior and an exterior of the airbag;
    a divider dividing the airbag interior into a first chamber and a second chamber separate from, and in fluid communication with, the first chamber;
    a vent cover closable over the at least one vent opening so as to restrict a flow of gas through the at least one vent opening, the vent cover also being openable so as to permit an unobstructed flow of gas through the at least one vent opening wherein said vent cover is opened based on a predetermined deflection of the divider; and
    a tether operatively connecting the vent cover to the divider such that the vent cover is closed when the divider is deflected toward the second chamber, and such that the vent cover is open when the divider is deflected toward the first chamber.

12. The airbag of claim 11 further comprising:
    an inter-chamber venting system operatively coupled to the divider, the venting system being openable to permit gas to flow unobstructed from the first chamber through the divider into the second chamber, when a pressure in the first chamber is greater than a pressure in the second chamber, the venting system being closable to restrict gas backflow from the second chamber into the first-chamber when the pressure in the second chamber is greater than a pressure in the first chamber.

13. A vehicle occupant protection system comprising an airbag in accordance with claim 11.

14. An airbag system comprising an airbag in accordance with claim 11.

15. A vehicle including an airbag in accordance with claim 11.

16. An airbag comprising:
an outer shell defining an interior;
a divider dividing the interior into an upper chamber and a lower chamber separate from, and in fluid communication with, the upper chamber, the divider being deflectable toward the lower chamber and also toward the upper chamber;
at least one vent opening structured to enable fluid communication between the interior and an exterior of the airbag; and
a vent cover closable over the at least one vent opening so as to restrict a flow of gas through the at least one vent opening, the vent cover also being openable so as to permit an unobstructed flow of gas through the at least one vent opening wherein said vent cover is opened based on a predetermined deflection of the divider, wherein the divider is structured to deflect in a direction toward the first chamber responsive to pressure exerted on the airbag exterior by contact with a torso of a vehicle occupant, prior to contact between a head of the occupant and the airbag.

17. A vehicle occupant protection system comprising an airbag in accordance with claim 16.

18. An airbag system comprising an airbag in accordance with claim 16.

19. A vehicle including an airbag in accordance with claim 16.

20. The airbag of claim 16 wherein said vent cover is closable to restrict a flow of gas through the at least one vent opening when the divider is deflected in a first direction, and openable so as to permit an unobstructed flow of gas through the at least one vent opening, the vent cover being operatively coupled to the divider such that the vent cover is openable when the divider is deflected in a direction toward the first chamber and closed when the divider is deflected toward the second chamber.

\* \* \* \* \*